(12) United States Patent
Sankar et al.

(10) Patent No.: US 8,718,835 B2
(45) Date of Patent: May 6, 2014

(54) OPTIMIZED TEMPERATURE-DRIVEN DEVICE COOLING

(75) Inventors: Sriram Sankar, Redmond, WA (US); Mark E. Shaw, Sammamaish, WA (US)

(73) Assignee: Microsoft Corporation, Redmond, WA (US)

( * ) Notice: Subject to any disclaimer, the term of this patent is extended or adjusted under 35 U.S.C. 154(b) by 143 days.

(21) Appl. No.: 13/163,657

(22) Filed: Jun. 17, 2011

(65) Prior Publication Data
US 2012/0323400 A1 Dec. 20, 2012

(51) Int. Cl.
*G05D 23/00* (2006.01)

(52) U.S. Cl.
USPC .......................................... 700/300; 702/132

(58) Field of Classification Search
USPC ............................ 700/300; 324/224; 702/132
See application file for complete search history.

(56) References Cited

U.S. PATENT DOCUMENTS

| | | | |
|---|---|---|---|
| 6,029,119 A * | 2/2000 | Atkinson ....................... | 702/132 |
| 7,506,190 B2 * | 3/2009 | Thomas et al. ............... | 713/322 |
| 2003/0176985 A1 * | 9/2003 | Chen .............................. | 702/132 |
| 2006/0064999 A1 | 3/2006 | Hermerding et al. | |
| 2006/0184937 A1 | 8/2006 | Abels et al. | |
| 2008/0005591 A1 * | 1/2008 | Trautman et al. ............ | 713/300 |
| 2008/0185446 A1 | 8/2008 | Tozer | |
| 2009/0235097 A1 | 9/2009 | Hamilton et al. | |
| 2010/0280680 A1 * | 11/2010 | Angell et al. ................. | 700/300 |
| 2012/0166015 A1 * | 6/2012 | Steinbrecher et al. ....... | 700/300 |
| 2012/0271481 A1 * | 10/2012 | Anderson et al. ............ | 700/299 |

OTHER PUBLICATIONS

Otto, Eugene, "Temperature-Aware Operating System Scheduling", Retrieved at <<http://www.cs.virginia.edu/~skadron/Papers/eugene_otto_thesis.pdf, Mar. 31, 2006, pp. 29.

Rajan, et al., "Temperature-Aware Scheduling: When is System-Throttling Good Enough?", Retrieved at <<http://www.research.ibm.com/people/d/dpkrjn/DeepakTR07.ps>>, The Ninth International Conference on Web-Age Information Management, Retrieved Date: Jan. 12, 2010, pp. 1-15.

Patterson, Michael K., "The Effect of Data Center Temperature on Energy Efficiency", Retrieved at <<http://www.eco-info.org/IMG/pdf/Michael_K_Patterson_-_The_effect_of_Data_Center_Temperature_on_Energy_Efficiency.pdf>>, Proceedings of 11th Intersociety Conference on Thermal and Thermomechanical Phenomena in Electronic Systems, Retrieved Date: Jan. 12, 2010, pp. 1167-1174.

"Power and Cooling in the Data Center", Retrieved at <<https://images01.insight.com/media/pdf/AMD_Power_Cooling_WP.pdf>>, Retrieved Date: Jan. 12, 2010, pp. 8.

* cited by examiner

*Primary Examiner* — Mohammad Ali
*Assistant Examiner* — Emilio J Saavedra
(74) *Attorney, Agent, or Firm* — Jim Sfekas; Alin Corie; Micky Minhas

(57) ABSTRACT

An optimized temperature-driven device cooling mechanism factors in power consumption of thermal management components, as well as processing components. A decision engine consults a knowledge base comprising information regarding power consumption and thermal impact of cooling components and processing components. The decision engine can delay additional cooling if the power consumption of cooling components is greater than the increase in power consumption of processing components due to increases in ambient temperature. The knowledge base is populated by published specifications and by empirically derived data that can be based on tests performed on components. Thermal management strategies can be user selected and can include strategies that avoid controlling certain components such as, for example, processing components, instead focusing only on cooling and other components. Cooling includes heat distribution, such as by transferring processing from one processing component to another.

18 Claims, 4 Drawing Sheets

OPTIMIZED TEMPERATURE-DRIVEN DEVICE COOLING

BACKGROUND

As silicon-based electronics heat up, a greater amount of "leakage current" is generated, consuming power without doing any useful work. Such power is released in the form of heat, further heating up the surrounding electronics. Consequently, modern silicon-based electronics typically provide for some mechanism of cooling including both active and passive cooling mechanisms. Passive cooling mechanisms can include mechanisms whose cooling properties are not designed to be adjusted, such as, for example, heat sinks, thermal transfer paste and other like mechanisms, while, on the other hand, active cooling mechanisms can include mechanisms whose cooling properties can be actively adjusted, such as, for example, fans, water cooling pumps, climate control systems and other like mechanisms.

Typically, active cooling mechanisms are designed to maintain a predetermined temperature range irrespective of other considerations, such as, for example power consumption considerations. For example, most modern computing devices comprise at least one fan whose speed is controlled to maintain a predetermined temperature range. As the temperature of various electronics of these modern computing devices increases towards the upper end of this predetermined temperature range, the speed of the fans is increased in order to increase the cooling being applied and, thereby, decrease the temperature and return it back towards the middle of the predetermined temperature range. Such an increase in the speed of the fans is solely the result of the increase in temperature, and does not take other factors into account.

Active cooling mechanisms, such as fans, however, consume power in order to provide cooling capabilities. While modern computing devices do comprise power management capabilities, the power consumption of active cooling mechanisms is not included in those power management capabilities. Instead, the power management implemented by modern computing devices is based only on a performance-versus-power trade-off. More specifically, modern silicon-based electronics, such as computer processors, typically comprise multiple performance states, with higher performance states consuming more power, and lower performance states consuming less power. As such, the power management implemented by modern computing devices focuses either on when lower performance states can be selected to conserve power without impacting performance, or when lower performance states must be selected to conserve power because a power source, such as a battery, is nearly exhaustion. For example, during periods of low processing power utilization, such as, for example, when a user is composing an e-mail message, power management can cause the processor to enter into a lower performance state to conserve power. Such can be especially helpful within the context of computing devices that have limited power resources, such as laptop computing devices that often rely on limited battery power capability. These same computing devices having limited power resources can, likewise, utilize existing power management to force the selection of lower performance states, even when more performance would be desirable, if the power resources of such devices are near exhaustion. However, such power management does not take into account the temperature at which the electronics of the host computing device are operating. Instead, if the power is available, and the processing capability is required, power management will leave a processor to continue executing in a high-performance state even if such results in high ambient temperatures, and will simply deal with such high ambient temperatures by increasing the operation of cooling mechanisms such as fans.

SUMMARY

In one embodiment, the thermal management of a computing device is optimized by factoring in the power consumption of cooling mechanisms, as well as the thermal impact of computational performance, to implement optimized thermal management strategies. Such thermal management strategies can result in delaying the activation of aggressive cooling, even when faced with rising temperatures, because the additional power consumed by aggressive cooling is greater than the power lost through leakage current as a result of the increase in temperatures.

In another embodiment, a knowledge base can be constructed comprising information describing the thermal impact and power consumption of various computing devices and components. Such a knowledge base can include published specifications, such as a power consumption of processors across all of the various performance states supported by those processors, and can also include empirically derived information, such as a cooling performance and power consumption of fans at various speeds. To the extent that published specifications are unavailable, empirical tests can be performed to derive the empirically derived information.

In a further embodiment, a decision engine can utilize the information of the knowledge base to identify optimized thermal management instructions to components of a computing device, including processing components and cooling components. The decision engine can monitor the temperature of the various components of a computing device, and the power consumption thereof, and can continually adjust the thermal management instructions to the components of the computing device, including transferring processing from one processing component to another. Additionally, the decision engine can receive external data that can impact its thermal management instructions.

In a still further embodiment, the decision engine can implement independent strategies that can define the parameters within which the thermal management instructions generated by the decision engine are optimized. Such independent strategies can be selected by a user through a user interface through which the user can communicate with the decision engine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
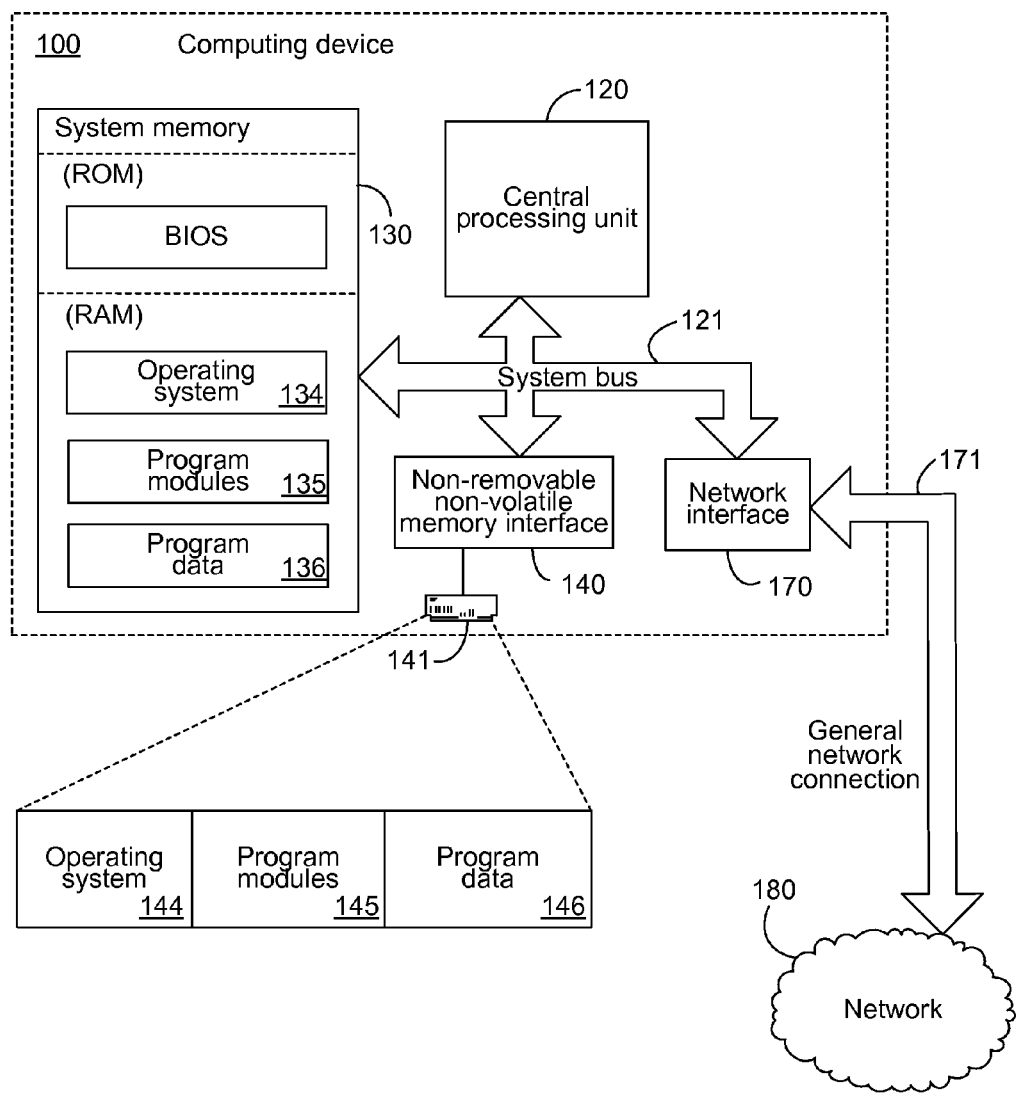
FIG. 1 is a diagram of an exemplary computing device.

The following description relates to an optimized temperature-driven device cooling mechanism. In determining how to respond to a given temperature at a component of a computing device, a decision engine can consult a knowledge base that can comprise information regarding the power consumption and thermal impact of components of a computing device, including cooling components themselves. As such, the decision engine can instruct cooling components to delay aggressive cooling if the power consumption of such cooling components is greater than the increase in power consumption of processing components due to increases in ambient temperature, and if the processing components would remain within their proper thermal operating ranges. The knowledge base can be populated by published specifications and by empirically derived data that can be based on tests performed on those components in a computing device for which appropriate published specifications could not be found. Independent thermal management strategies can be implementable, and users can select from among them. Such thermal management strategies can include strategies that avoid controlling certain components such as, for example, processing components, instead focusing only on cooling and other components.

The techniques described herein make reference to specific thermal management components, such as fans, and specific processing components, such as multi-core central processing units that have the capability to enter into lower power consumption states that typically have lower processing capability. Such references, however, are strictly exemplary and are made for ease of description and presentation, and are not intended to limit the mechanisms described to the specific components referenced. Instead, the mechanisms described herein are applicable to achieve optimized temperature-driven device cooling for any computing device whose processing capability is thermally linked and which comprises thermal management components that consume power.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional server computing racks or conventional personal computers, and include other computing configurations, including handheld devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary computing device 100 is illustrated, comprising, in part, hardware elements that can be utilized in, and aid, the methods described below. For purposes of the descriptions below, the exemplary computing device 100 can be a stand-alone computing device, or it can be a portion of a server computing device, such as a single "blade". The exemplary computing device 100 can include, but is not limited to, one or more central processing units (CPUs) 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and other components of the computing device 100 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) such as the Internet, or other networks. The computing device 100 is connected to the general network connection 171 through a network interface or adapter 170 that is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

The computing device 100 may also include other removable/non-removable, volatile/nonvolatile computer storage media. By way of example only, FIG. 1 illustrates a hard disk drive 141 that reads from or writes to non-removable, non-volatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Figure 2:
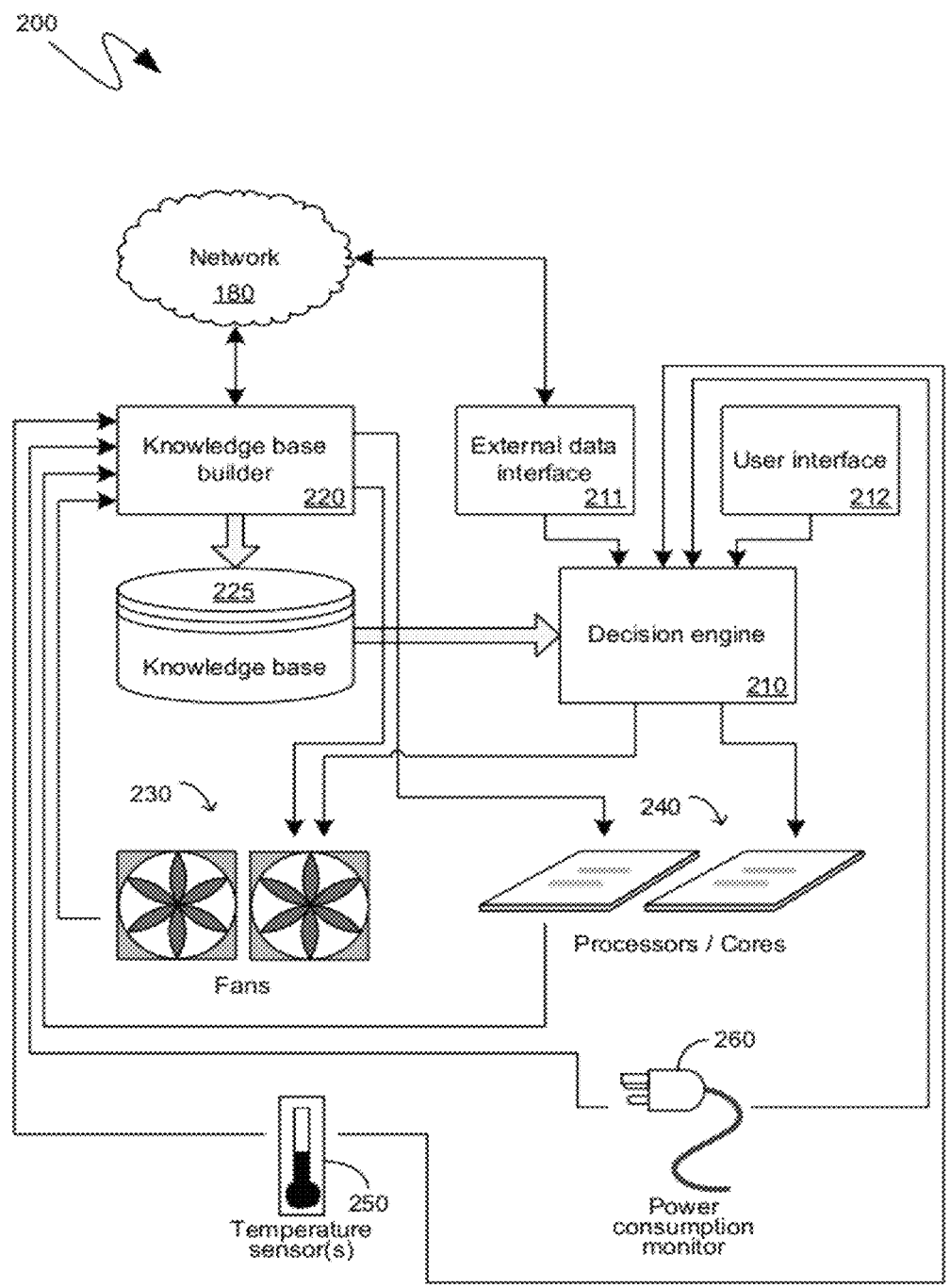
FIG. 2 is a system diagram illustrating an exemplary optimized thermal management system.

Turning to FIG. 2, the system 200 shown therein comprises specific aspects and portions of the exemplary computing device 100 that were not specifically illustrated in FIG. 1. For example, the exemplary computing device 100 of FIG. 1 can comprise cooling mechanisms, including both active and passive cooling mechanisms. Typically, passive cooling mechanisms can include heat-sinks, heat pipes, thermal paste, and other like thermal transfer devices. By contrast, active cooling mechanisms are those mechanisms whose cooling capabilities can be adjusted, such as by control signals. Typically, active cooling mechanisms include mechanisms that consume power in order to provide cooling. Illustrated in the system 200 FIG. 2 are fans 230 that are intended to represent any type of active cooling mechanism including, for example, the water pumps of water cooling mechanisms, air conditioning mechanisms, Peltier devices, and other like active cooling mechanisms.

Additionally, the exemplary computing device 100 illustrated in FIG. 1, and described in detail above, can comprise one or more temperature sensors, such as the temperature sensors 250 shown in the system 200 of FIG. 2. As will be recognized by those skilled in the art, the temperature sensors 250 are typically thermally coupled to, or otherwise oriented, to measure the temperature of specific components of the exemplary computing device 100, again shown in FIG. 1, or its environment. Typically, the temperature sensors 250 can comprise temperature sensors of various computational components, such as processors, hard drives, graphics cards, wireless communication cards, and other like computational components. Additionally, the temperature sensors 250 can comprise temperature sensors designed to sense environmental temperatures, such as a case temperature sensor or an air intake temperature sensor.

Computing devices can also comprise power consumption monitors, such as the power consumption monitor 260, illustrated in the system 200 of FIG. 2, for measuring the power consumed by that computing device at any point in time. Due to the expense of such monitors, often power consumption monitors, such as the power consumption monitor 260, are not built into a computing device as a standard component but are, instead, separately purchasable and communicationally coupleable to such a computing device. Power consumption monitors external to a computing device can be communicationally coupled with it such that computer-executable instructions executing on the computing device can obtain power consumption measurements from the power consumption monitor.

The system 200 of FIG. 2 further illustrates one or more processors or processing cores 240. The processors 240 can include, but are not limited to, the one or more central processing units 120 illustrated as part of the exemplary computing device 100 in FIG. 1, and described in detail above. Additionally, the processors 240 can include the processing units of graphics cards, communication cards, including wired and wireless communication cards, data transfer processing units, and other like processors. For purposes of the descriptions herein, the processors 240 are silicon-based processors, or other material based processors, where as the temperature of the processors 240 increases a greater amount of power is consumed by their processors 240 to perform the same amount of processing. For example, within the context of silicon-based processors, as the temperature of the processors 240 increases, the amount of "leakage current" within the processors 240 increases such that, to perform the same amount of processing, the processors draw an increasing amount of current due to the increase in the leakage current and, consequently, consume a greater amount of power. Additionally, since the additional power consumed, due to the increase in leakage current, is wasted as heat a self-reinforcing cycle can be established.

Additionally, the processors 240 can optionally comprise reduced power consumption operation modes, typically known as "power saving" modes, where the processors 240 operate in a reduced capacity, while simultaneously consuming less power. In one embodiment, one such power saving mode is implemented by changing a processor's "P-state". As will be recognized by those skilled in the art, a processor's "P-states" represent different frequencies and/or voltages at which the processor can be operated, with higher frequencies and higher voltages resulting in a greater amount of power consumption, while lower frequencies and lower voltages result in reduced power consumption. In another embodiment, another power saving mode can be implemented by changing a processors "T-state". As will again be recognized by those skilled in the art, a processor's "T-states" represent clock-cycle-skipping mechanisms, with decreased power consumption being realized as an increasing amount of clock cycles are skipped by the processors.

Typically, information regarding the various power saving modes implemented by the processors 240 can be obtained from the manufacturer of such processors including, for example, the various "P-states" and "T-states" supported by the processors 240. Additionally, such manufacturer specifications can also comprise information regarding the operation and power consumption of the processors 240 as their temperature increases, or other like quantification of the effect and magnitude of leakage current within the processors as a function of temperature.

In one embodiment, a knowledge base builder component 220 can obtain such information and can store it in a knowledge base 225. For example, the knowledge base builder 220 can query processors 240 for identifying information such as a model number or serial number. Utilizing such information, the knowledge base builder 220 can obtain published information regarding the processors 240, such as from a computing device of the manufacturer of the processors 240 that is communicationally coupled with the knowledge base builder 220 via the network 180. The knowledge base builder 220 can obtain published, or already existing, information regarding the power consumption and thermal properties of multiple components of a computing device, including the processors 240, in a similar manner.

Certain components or devices may not have such specifications already published. In such a case, the knowledge base builder 220 can perform one or more tests to empirically determine power consumption and thermal characteristics. For example, in the illustrated system 200 of FIG. 2, the knowledge base builder 220 can perform tests to determine the power consumption and cooling characteristics of the fans 230. In one embodiment, such tests can comprise knowledge base builder 220 executing a known series of processing tests on the processors 240 while simultaneously operating the fans 230 at predetermined speeds and monitoring the results of such operation, including monitoring the power consumed by the fans, such as would be provided by the power consumption monitor 260, and the resulting temperature changes within the computing device, such as would be provided to the temperature sensors 250. For example, in performing such tests, the knowledge base builder 220 can establish the power consumption of the fans 230 when operated at, for example, 25% of their maximum capacity, and the knowledge base builder 220 can further establish cooling characteristics of the fans 230 when operated at that same capacity. Such empirically derived information can be stored in the knowledge base 225 for subsequent utilization by a decision engine, such as the decision engine 210.

The decision engine 210 can utilize the information available in the knowledge base 225 to implement optimized temperature-driven device cooling strategy including, for example, by issuing commands to control the operation of cooling components, such as the fans 230, and by issuing commands to control the operation of processing components that generate heat, such as the processors 240. In one embodiment, as will be described in further detail below, the decision engine 210 can select from among multiple different, and independent, thermal management strategies including, for example, strategies that can be implemented, by the decision engine 210, by only issuing commands to the cooling components themselves, and strategies that can be implemented by the decision engine 210 by issuing commands to both the cooling components and the processing components as well. A user interface, such as the user interface 212, can enable users to select from among those multiple different, independent, thermal management strategies, and otherwise communicate with the decision engine 210. Additionally, in another embodiment, and as will also be described in further detail below, an external data interface 211 can provide the decision engine 210 with information, such as information obtained via the network 180, that can aid the decision engine 210 in implementing a thermal management strategy. Information provided by the external data interface 211 can include information that varies over time, such as, for example, weather forecasts, the cost of power, and other like variables that can be relevant to the thermal management strategy being implemented by the decision engine 210.

Figure 3:
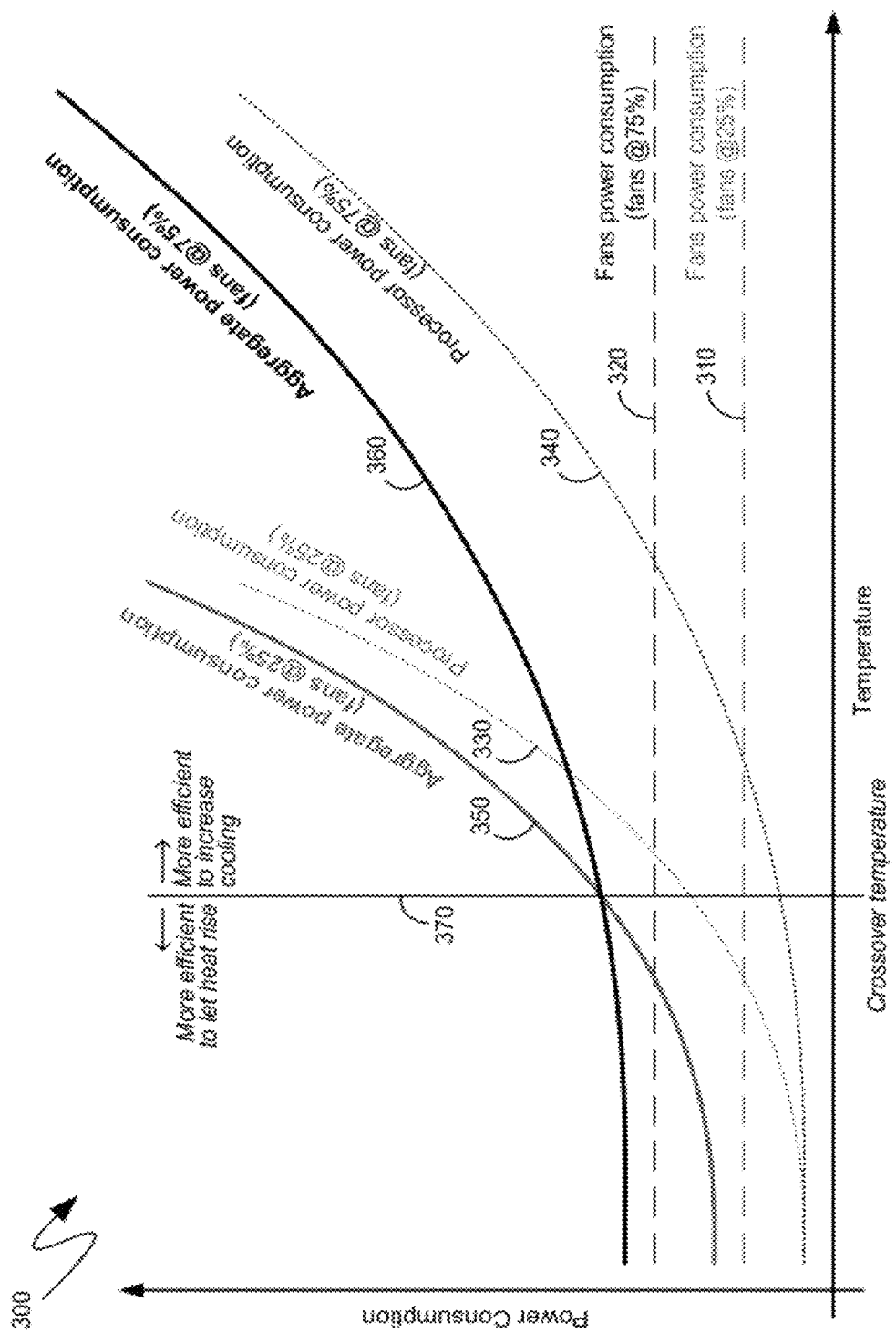
FIG. 3 is a chart illustrating an exemplary optimization of thermal management based on an exemplary set of factors.

Turning to FIG. 3, one exemplary operation of the decision engine 210, shown in the system 200 of FIG. 2, is illustrated with reference to the graph 300 shown in FIG. 3. More specifically, the knowledge base 225, shown in the system 200 of FIG. 2, can comprise information regarding the power consumption of the fans 230, also shown in FIG. 2. Thus, for example, the power consumption of the fans when operated at 25% of maximum capacity can be reflected by the line 310, and can represent a fixed power consumption amount that does not vary as the temperature increases. Similarly, the power consumption of the fans when operated at 75% of maximum capacity can be reflected by the line 320, which can also represent a fixed power consumption amount that does not vary as the temperature increases, and which is also a higher power consumption amount than the power consumed by the fans when operated at 25% of maximum capacity. As indicated previously, such information can have been obtained empirically by testing the fans 230, such as by the knowledge base builder 220, shown in FIG. 2.

The knowledge base 225, shown in FIG. 2, can also comprise information regarding the power consumption of the processors 240, also shown in FIG. 2. In particular, and as can be seen by the graph 300 of FIG. 3, the power consumption of the processors can increase as the temperature increases due to an increase in the leakage current present in such processors. Additionally, when the fans are operated at 25% of their maximum capacity, they can provide a certain amount of cooling to the processors, in the form of heat transfer from the processors to the surrounding air. Conversely, when the fans are operated at 75% of their maximum capacity, they can provide a greater amount of cooling to the processors. Thus, if the temperature referenced by the graph 300 is an ambient temperature, such as of the air surrounding processors, then, as that ambient temperature increases, the ability of the processors to cool themselves down by transferring heat to the air decreases, the leakage current increases, and the power consumed by the processors increases. More aggressive cooling by the fans, however, can delay this increase in power, since more aggressive cooling by the fans can enable the processors to continue to transfer heat to the surrounding air even as that air temperature increases. Consequently, as shown by the graph 300 of FIG. 3, when the fans are operated at, for example, 25% of their maximum capacity, the processor power consumption as a function of the ambient temperature can increase in the manner generally illustrated by the line 330. Conversely, when the fans are operated at, for example, 75% of their maximum capacity, the processor power consumption as functioning ambient temperature can increase more slowly, since the fans, operating at a greater capacity, providing the processors with more opportunity to transfer their heat to the surrounding air. Consequently, the line 340, representing the processor power consumption as a function of the temperature (with the fans operated at 75% of their maximum capacity), can increase more slowly than the line 330.

The overall, or aggregate, power consumption of the computing device can be the sum of the power consumed by processing components and the thermal management, or cooling, components. Consequently, as shown by the graph 300 of FIG. 3, the aggregate power consumption when the fans are operated at 25% of their maximum capacity can be the sum of the fans' power consumption line 310 and the processor power consumption line 330, which is illustrated by the aggregate power consumption line 350. Similarly, the aggregate power consumption when the fans are operated at 75% of their maximum capacity can be the sum of the fans' power consumption, as represented by the line 320, and the processor power consumption line 340, which sum is illustrated by the aggregate power consumption line 360. The aggregate power consumption line 350, representing the aggregate power consumption of the computing device when fans are operated to 25% of their maximum capacity, can intersect with the aggregate power consumption line 360, representing the aggregate power consumption of the computing device when the fans are operated at 75% of their maximum capacity, at a crossover temperature 370.

While the ambient temperature remains below the crossover temperature 370, it can be more efficient to simply allow the processor power consumption to increase, as a result of an increase in the leakage current due to the increasing temperature, as opposed to increasing the cooling provided by the fans, since the power consumption of increased cooling can be greater than the power consumption due to the increase in the leakage current. Conversely, above crossover temperature 370, the increase in the leakage current due to the increasing temperature can be sufficiently large that it can be more efficient to increase the cooling provided by the fans, since the increase in power consumption by the fans can be offset by slowing the increase of power consumption by the processors.

By considering the power consumption of the cooling components, as well as the power consumption by the processing components, the decision engine 210, shown in FIG. 2, can provide for optimized device cooling. In particular, by taking into account the power consumption of the cooling components, the decision engine 210, shown in FIG. 2, can delay the activation, or increased operation, of the cooling components beyond when they would normally be activated or increased. For example, and returning to the above example, typical cooling strategies would have increased the operation of fans well below the crossover temperature 370, since the crossover temperature 370, representing a point at which the leakage current is already increased, can be above a typical temperature range within which the processors would attempt to be maintained by the cooling system. However, as indicated previously, the maintenance of a temperature range, such as is performed by computing devices today, is performed independently of the power consumption of the cooling mechanisms and, as such, can result in sub optimal cooling strategies when viewed from a power consumption standpoint. Such inefficiencies can be especially damaging within the context of computing devices that have limited power sources, such as portable computing devices, and they can be especially damaging within the context of server computing devices where many hundreds or thousands of computing devices can be abrogated into a single server farm and the aggregate power consumption of such a server farm can be substantial, such that the above described power optimizations can provide for significant reductions in operating costs.

In one embodiment, the decision engine 210, shown in FIG. 2, can implement optimized, temperature driven, device cooling strategy in a manner analogous to that described in detail above. In particular, the decision engine 210, shown in FIG. 2, can activate, or increase the operation of, one or more cooling components based on a balance between the additional power consumed by those cooling components and the additional power that would be consumed by processing components, such as through increasing leakage current, were those processing components to continue operating without the benefit of the increase in cooling provided by the cooling components. In such an embodiment, one or more crossover temperatures, such as the crossover temperature 370, shown in the graph 300 of FIG. 3, can be determined by the decision engine 200, shown in FIG. 2, and the instructions to, for example, the cooling components can be made in accordance with those determined crossover temperatures.

In another embodiment, in addition to controlling the activation, and increase in operation, of cooling, or thermal management, components, the decision engine 200, shown in FIG. 2, can also control the thermal management, and power management, aspects of processing components. More specifically, and as indicated previously, processing components, such as the processors 240, shown in FIG. 2, can comprise lower power consumption states, such as can be implemented by specifying various P-states and T-states. As will be recognized by those skilled in the art, the operation of processing components in lower power consumption states reduces the thermal impact of such processing components, since the consumption of less power results in less power being wasted in the form of generated heat. Consequently, in such another embodiment, the decision engine 210, shown in FIG. 2, can control, not only when, and to what extent, cooling components are activated and utilized, but also when, and to what extent, processing components are transitioned into lower power consumption states.

In one embodiment, a preference can be shown to utilizing P-states first, and resorting to T-states only when P-states have been exhausted. For example, as temperature increases, and there is a need to reduce the amount of heat being generated by processing components, the amount of heat being generated by those processing components can be reduced by placing those processing components in low power consumption states through the use of reduced voltages and reduced frequencies of operation which, as will be recognized by those of skill in the art, represents the implementation of P-states. If, after implementing such P-states, there remains the need to further reduce the amount of heat being generated by processing components, the heat being generated by those components can be further reduced by performing no processing during one or more cycles of operation, thereby effectively skipping those cycles of operation, which, as will be recognized by those skilled in the art, represents the implementation of T-states.

As in the example described in detail above with reference to the graph 300 of FIG. 3, various crossover temperatures, or other like determinants, can be established that can trigger a decision, such as by the decision engine 210, shown in FIG. 2, as to whether to implement low-power states among processing components, or whether to activate, or further increase, the cooling being provided by cooling components. In one embodiment, such a decision can be further informed by external data, such as that provided by the external data interface 211, shown in FIG. 2. For example, conceptually, the implementation of low-power states by the processing components can be analogous to the implementation of increased cooling by the cooling components except that, in the case of the former, power consumption can decrease, as can the ability to do processing tasks, while in the case of the latter, power consumption can increase, while the ability to do processing tasks remains the same. Thus, a decision of whether to implement low-power states in the processing components, increased cooling by the cooling components, or some combination thereof, can be further informed by external data that can indicate a preference as between processing performance and the cost of power. For example, as indicated previously, such external data can include information regarding a current cost, or an anticipated future cost, of power. In such an example, if the external data indicates that power is currently expensive, such as during an afternoon period, but is expected to become less expensive, such as during a late evening period, the decision engine 210, shown in FIG. 2, can implement low-power states in the processing components, rather than increasing the operation of the cooling components, in order to minimize the overall power consumption while addressing the heat being generated by the processing components. As another example, if the external data indicates that the processing being performed by the computing device is important, such as, for example, if the processing is being performed during a peak processing time during which a premium is paid for processing capability, then the decision engine 210, shown in FIG. 2, can increase the operation of the cooling components in order to maintain the processing capabilities of the processing components.

In one embodiment, a user interface, such as the user interface 212, shown in FIG. 2, can enable the decision engine 210, also shown in FIG. 2, to present a user with multiple, independent thermal management strategies. As indicated previously, one such thermal management strategy can maintain the processing capability of processing components and can provide optimized thermal management only by controlling the operation of cooling components, such as by determining when to activate, or increase the operation of, the cooling components as weighed against additional power that would be consumed by the processing components as a result of increased heat. As also indicated previously, another such thermal management strategy can balance power consumption with performance and can control, not only the operation of the cooling components, but also the operation of the processing components as well including, specifically, whether and when such processing components enter available low-power states.

In another embodiment, the decision engine 210, shown in FIG. 2, can control not only whether and when processing components enter available low-power states, but also which processing components perform tasks that can be performed by two or more different processing components. For example, as will be known by those skilled in the art, modern processors, such as central processing units, graphics processors, and other like processors comprise multiple processing cores on a single physical processing unit or "chip". Additionally, as will also be known by those skilled in the art, modern computing devices can comprise two or more such physical chips, such as on a "motherboard". Despite the availability of multiple ones of such cores and chips, many processing tasks can require only a single core of a single chip. As such, one core of one chip may be disproportionately burdened with processing operations and, consequently, the heat being generated by such processing can be concentrated on only a small portion of a single physical chip. Thus, in such another embodiment, the decision engine 210, shown in FIG. 2, can control where such processing operations can take place and can, for example, move, or transfer, the processing of a particular set of computer-executable instructions from one core or chip to a another core or chip, to more evenly distribute the heat being generated by such processing and to, thereby, reduce the need for active cooling, or resort to low-power processing states.

Figure 4:
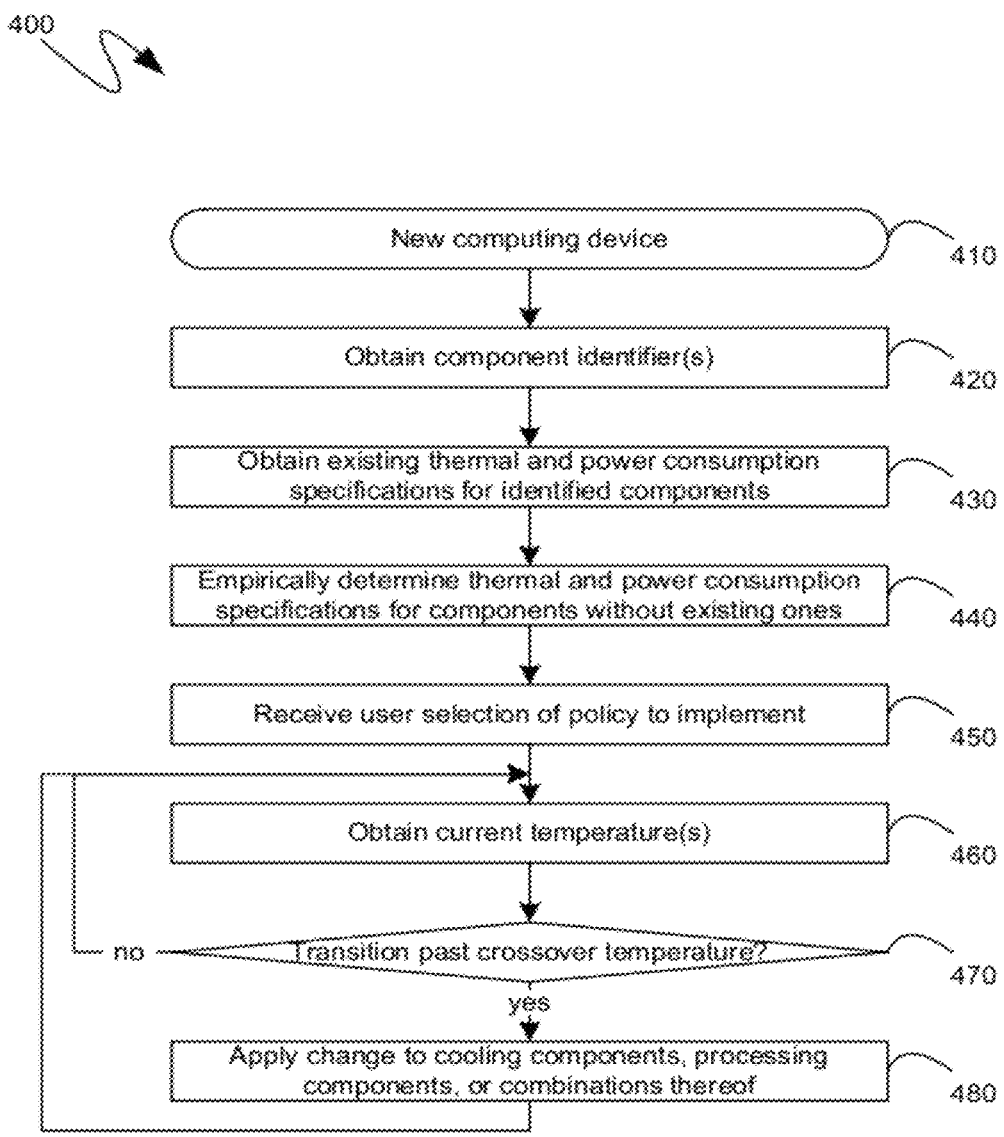
FIG. 4 is a flow diagram of an exemplary operation of an exemplary optimized thermal management system.

Turning to FIG. 4, the flow diagram 400 shown therein illustrates an exemplary series of steps that can be performed by a system providing optimized temperature-driven device cooling. Initially, as shown in the flow diagram 400 of FIG. 4, a new computing device can be initiated at step 410. As indicated previously, such a new computing device can be a new standalone computing device, such as a laptop personal computer, or it can be a component of a larger server structure, such as an individual server "blade" that is inserted into a server rack within a server farm. Subsequently, at step 420, one or more component identifiers can be obtained including, for example, identifiers of one or more of the processing components and identifiers of one or more of the cooling components. At step 430 existing thermal and power consumption specifications for the identified components can be obtained. In one embodiment, such thermal and power consumption specifications can be obtained by establishing a communicational connection to a network of computing devices, at least one of which can host such specifications.

In one embodiment, for those devices identified at step 420 for which no, or inappropriate, thermal and power consumption specifications are found at step 430, processing can proceed to empirically determine such thermal and power consumption specifications at step 440. As indicated previously, such an empirical determination can be performed by executing a standardized set of processes, activating, or increasing, one or more cooling components, and then monitoring the resulting temperatures and power consumption. The information obtained by such empirical determinations at step 440 can be stored in a knowledge base together with the existing specifications that were obtained at step 430.

Subsequently, a user selection of a thermal management policy to implement can be received at step 450. As indicated previously, different thermal management policies can enable the control of just the cooling components of a computing device, or to enable multidimensional control of both the cooling components and the processing components. At step 460, a current temperature can be obtained including, for example, the current temperature at one or more of the processing units, the current ambient temperature, and other like relevant temperatures. At step 470, a determination can be made as to whether the temperature obtained at step 460 transitioned past a determined crossover temperature that identifies a temperature at which changes can be made to the cooling components, the processing components, or combinations thereof. Such a transition past can include increasing beyond a next greater crossover temperature and decreasing below a next lesser crossover temperature. If, at step 470, it is determined that the current temperature has not transitioned past a crossover temperature, then the operation of processing and cooling components can remain unchanged. However, if, at step 470, it is determined that the current temperature has transitioned past a crossover temperature, then changes can be made, and commands can be issued, to cooling components, processing components, or combinations thereof, at step 480, in accordance with the policy selected by the user at step 450. For example, if the policy selected at step 450 indicated that processing capability was to be maintained then the changes applied, at step 480, can be limited to changes to the cooling components such as, for example, determining whether and when to activate or increase the operation of the cooling compartments if the transition, at step 470, was for the temperature obtained at step 460 to be greater than a crossover temperature, or, alternatively, whether and when to deactivate or decrease the operation of the cooling components if the transition, at step 470, was for the temperature obtained at step 460 to be less than a crossover temperature. Similarly, as another example, if the policy selected at step 450 indicated a balanced approach was to be taken, then the changes applied, at step 480, can include changes to the cooling components, as well as changes to the processing components, such as, for example entering low-power processing states if the transition, at step 470, was for the temperature obtained at step 460 to be greater than crossover temperature, or, alternatively, entering unrestricted processing states if the transition, at step 470, was for the temperature obtained at step 460 to be less than a crossover temperature.

In such a manner, optimized temperature-driven device cooling can be provided for. In one embodiment, the above-described mechanisms can be utilized on computing devices whose power supplies are limited, such as, for example, battery-operated computing devices that have only limited battery power capability and capacity. Such battery-operated computing devices can conserve battery power by, for example, delaying the acceleration of fan speeds, which can consume more power then the power that would otherwise be lost as a result of leakage current when the processing components of such a battery operated computing device heated up due to the throttling back of the fans. More significantly, in another embodiment, the above-described mechanisms can be utilized on computing devices within the context of a server environment, such as individual server "blades" in a server rack in a server farm. In such an embodiment, processing being performed by one set of processing components can be moved, or transferred, to another set of processing components, thereby maintaining processing speed while delaying, or avoiding, any increase in the cooling provided by cooling components, thereby avoiding the additional power consumption of such cooling components.

As can be seen from the above descriptions, an optimized temperature-driven device cooling has been presented. In view of the many possible variations of the subject matter described herein, we claim as our invention all such embodiments as may come within the scope of the following claims and equivalents thereto.

We claim:

1. One or more computer-readable storage media comprising computer-executable instructions for optimizing device cooling, the computer-executable instructions directed to steps comprising:
    obtaining information describing thermal and power consumption characteristics of a cooling component of the device and a processing component of the device;
    identifying, based on the obtained information, a crossover temperature beyond which a cooling component power consumption increase due to increased cooling by the cooling component is less than a processing component power consumption increase due to operation of the processing component at temperatures above the crossover temperature, and wherein identifying the crossover temperature comprises identifying multiple crossover temperatures differing based on already existing cooling component power consumption and already existing processing component power consumption;
    obtaining a cost being paid for power and a cost being obtained for processing;
    preventing increased cooling component power consumption due to increased cooling by the cooling component while a temperature of the device is lower than the crossover temperature;
    generating commands to the processing component to enter into a lower-power state if the temperature of the device is above the crossover temperature and if either the cost being paid for power is greater than the cost being received for processing or if a processing being performed is a low priority processing; and
    generating commands to the cooling component to increase cooling by the cooling component if the temperature of the device is above the crossover temperature and if either the cost being paid for power is less than the cost being received for processing or if a processing being performed is a high priority processing.

2. The computer-readable storage media of claim 1, wherein the computer-executable instructions for generating the commands to the processing component to enter into the lower-power state comprise computer-executable instructions for transferring a processing being performed by the processing component to another processing component so as to more evenly distribute heat being generating by the processing.

3. The computer-readable storage media of claim 1, comprising further computer-executable instructions for performing a test to empirically determine the thermal and power consumption characteristics of the cooling component; wherein the obtaining the information comprises obtaining the empirically determined thermal and power consumption characteristics.

4. The computer-readable storage media of claim 1, further comprising computer-executable instructions for receiving, from a user, a thermal management strategy, the thermal management strategy further informing the generated commands to the processing component and the generated commands to the cooling component.

5. The computer-readable storage media of claim 1, further comprising computer-executable instructions for obtaining either an updated cost being paid for the power or an updated cost being received for the processing in accordance with anticipated changes in either the cost being paid for the power or the cost being received for the processing.

6. The computer-readable storage media of claim 1, further comprising computer-executable instructions for obtaining an identifier of at least one of the cooling component or the processing component; wherein the computer-executable instructions for obtaining the information describing the thermal and the power consumption characteristics of the cooling component and the processing component comprise computer-executable instructions for obtaining the information describing the thermal and the power consumption characteristics of at least one of the cooling component or the processing component from a computing device, hosting such information, based upon the obtained identifier.

7. A method for optimized cooling of a computing device implementing the method, the method comprising the steps of:
    obtaining information describing thermal and power consumption characteristics of a cooling component of the device and a processing component of the device;
    identifying, based on the obtained information, a crossover temperature beyond which a cooling component power consumption increase due to increased cooling by the cooling component is less than a processing component power consumption increase due to operation of the processing component at temperatures above the crossover temperature, and wherein identifying the crossover temperature comprises identifying multiple crossover temperatures differing based on already existing cooling component power consumption and already existing processing component power consumption;
    obtaining a cost being paid for power and a cost being obtained for processing;
    preventing increased cooling component power consumption due to increased cooling by the cooling component while a temperature of the device is lower than the crossover temperature;
    generating commands to the processing component to enter into a lower-power state if the temperature of the device is above the crossover temperature and if either the cost being paid for power is greater than the cost being received for processing or if a processing being performed is a low priority processing; and
    generating commands to the cooling component to increase cooling by the cooling component if the temperature of the device is above the crossover temperature and if either the cost being paid for power is less than the cost being received for processing or if a processing being performed is a high priority processing.

8. The method of claim 7, wherein the generating the commands to the processing component to enter into the lower-power state comprises transferring a processing being performed by the processing component to another processing component so as to more evenly distribute heat being generating by the processing.

9. The method of claim 7, further comprising the steps of performing a test to empirically determine the thermal and power consumption characteristics of the cooling component; wherein the obtaining the information comprises obtaining the empirically determined thermal and power consumption characteristics.

10. The method of claim 7, further comprising the steps of receiving, from a user, a thermal management strategy, the thermal management strategy further informing the generated commands to the processing component and the generated commands to the cooling component.

11. The method of claim 7, further comprising the steps of obtaining either an updated cost being paid for the power or an updated cost being received for the processing in accordance with anticipated changes in either the cost being paid for the power or the cost being received for the processing.

12. The method of claim 7, further comprising the steps of obtaining an identifier of at least one of the cooling component or the processing component; wherein the obtaining the information describing the thermal and the power consumption characteristics of the cooling component and the processing component comprises obtaining the information describing the thermal and the power consumption characteristics of at least one of the cooling component or the processing component from a computing device, hosting such information, based upon the obtained identifier.

13. A computing device comprising:
a processing component performing processing and generating heat at least in part as a result of leakage current that increases as temperature increases;
an active cooling component cooling the processing component and having multiple, selectable cooling capacities;
a knowledge base comprising information describing thermal and power consumption characteristics of the active cooling component and the processing component; and
a decision engine performing steps comprising:
obtaining the information from the knowledge base;
identifying, based on the obtained information, a crossover temperature beyond which a cooling component power consumption increase due to increased cooling by the cooling component is less than a processing component power consumption increase due to operation of the processing component at temperatures above the crossover temperature, and wherein identifying the crossover temperature comprises identifying multiple crossover temperatures differing based on already existing cooling component power consumption and already existing processing component power consumption;
obtaining a cost being paid for power and a cost being obtained for processing;
preventing increased cooling component power consumption due to increased cooling by the cooling component while a temperature of the device is lower than the crossover temperature;
generating commands to the processing component to enter into a lower-power state if the temperature of the device is above the crossover temperature and if either the cost being paid for power is greater than the cost being received for processing or if a processing being performed is a low priority processing; and
generating commands to the cooling component to increase cooling by the cooling component if the temperature of the device is above the crossover temperature and if either the cost being paid for power is less than the cost being received for processing or if a processing being performed is a high priority processing.

14. The computing device of claim 13, wherein the generating the commands, by the decision engine, to the processing component to enter into the lower-power state comprises transferring a processing being performed by the processing component to another processing component so as to more evenly distribute heat being generating by the processing.

15. The computing device of claim 13, further comprising a knowledge base builder performing steps comprising: performing a test to empirically determine the thermal and power consumption characteristics of the active cooling component; and storing the empirically determined thermal and power consumption characteristics of the active cooling component in the knowledge base.

16. The computing device of claim 13, further comprising a user interface for receiving selection of a thermal management strategy to implement on the computing device; wherein the thermal management strategy further informs the commands generated by the decision engine to the processing component and the cooling component.

17. The computing device of claim 13, wherein the decision engine performs further steps comprising obtaining either an updated cost being paid for the power or an updated cost being received for the processing in accordance with anticipated changes in either the cost being paid for the power or the cost being received for the processing.

18. The computing device of claim 13, further comprising a knowledge base builder performing steps comprising: obtaining an identifier of at least one of the cooling component or the processing component; and obtaining the information describing the thermal and the power consumption characteristics of at least one of the cooling component or the processing component from a computing device, hosting such information, based upon the obtained identifier.

* * * * *